United States Patent [19]

Kito et al.

[11] 4,421,560

[45] Dec. 20, 1983

[54] THERMOCHROMATIC MATERIALS

[75] Inventors: Tutomu Kito, Nagoya; Norikazu Nakasuji, Aichi; Takashi Kataoka, Kasugai; Hiroshi Inagaki, Aichi; Yutaka Shibahashi, Nagoya, all of Japan

[73] Assignee: Pilot Ink Company Ltd., Nagoya, Japan

[21] Appl. No.: 366,514

[22] Filed: Apr. 8, 1982

[30] Foreign Application Priority Data

Apr. 8, 1981 [JP] Japan ................................. 56-52579

[51] Int. Cl.³ ...................... C09D 11/00; C09D 11/02
[52] U.S. Cl. ..................................... 106/21; 427/150; 427/151
[58] Field of Search .................. 106/21; 427/150, 151; 430/864, 904, 935

[56] References Cited

U.S. PATENT DOCUMENTS 4,028,118 6/1977 Nakasuji et al. ...................... 106/27
4,091,004 5/1978 McConnell et al. ............ 260/146 T

*Primary Examiner*—John Kight, III
*Assistant Examiner*—Amelia B. Yarbrough
*Attorney, Agent, or Firm*—Sughrue, Mion, Zinn, Macpeak and Seas

[57] ABSTRACT

A reversible thermochromic material is disclosed in the application. The material is comprised of (A) an electron-donating chromatic organic compound and (B) an acidic phosphoric acid ester compound or metal salt thereof, wherein Components (A) and (B) are contained in a weight ratio of 1:1/10 to 50 by weight. The material may also contain a third Component (C) for controlling the temperature of coloration/decoloration of the thermochromatic material. The thermochromatic material undergoes reversible metachromatism at a temperature within the range of −50° C. to 120° C. Furthermore, the reversible thermochromic material may be contained within microcapsules.

4 Claims, No Drawings

THERMOCHROMATIC MATERIALS

FIELD OF THE INVENTION

The present invention relates to novel thermochromic materials exhibiting reversible metachromatism.

BACKGROUND OF THE INVENTION

Metal complex salt crystals exhibiting a specific metachromatism have heretofore been used as thermochromic materials. These metal complex salt crystals, however, have thermochromic temperature ranges of substantially from 50° C. to several hundred degrees centigrade (°C.). Most conventional thermochromic materials have thermochromic temperature ranges exceeding 100° C. Furthermore, there are no thermochromic materials exhibiting a metachromatism within temperature ranges which are used in everyday life. Thus, the conventional thermochromic materials can be used only in limited applications.

When using conventional thermochromic materials, it has not been possible to cause them to produce the desired color at the desired temperature. This is true because there are only a few substances which exhibit metachromatism at temperatures lower than 100° C. For example, a compound of Ag HgI turns from yellow to orange at 50° C., and a compound of Cu HgI from red to brown at 70° C. Therefore, it is not possible to select the type of color, and, furthermore, any alternation in color is not distinguishably clear.

Moreover, the metal complex salt crystals do not have any light transparency and, therefore, it is not possible to alternately cover and reveal the background by a means such as temperature changes. Many of these complex salts contain heavy metals, and in particular, the substances exhibiting a metachromatism at temperatures lower than 100° C. contain mercury as described hereinbefore. These substances, therefore, require sufficient attention in handling due to possible pollution related problems. Thus, it is not desirable to use these substances in large amounts.

Other thermochromic materials include liquid crystals. These liquid crystals have thermochromic temperature ranges of from about −10° C. to about 200° C., and there are only one or two liquid crystals which exhibit a metachromatism at temperatures lower than 0° C. As is the case with the above-described metal complex salt crystals, therefore, it is not possible to obtain the desired color at the desired temperature using such liquid crystals. It is only possible to obtain the color that is inherent to the liquid crystal. Furthermore, the crystals are undesirable because the effect inevitably degrades when they are brought into contact with other substances because they are chemically very sensitive. Thus, it is not advantageous to use such liquid crystals as thermochromic materials. Disadvantages of these materials are clear considering that: (1) there can be obtained only materials of dark color tone since cholesteric liquid crystals require a black background; and (2) such compounds are very expensive.

A considerable number of applications of metachromatism, i.e., the phenomenon of alternation in color due to changes in temperature are known. However, no suitable thermochromatic materials have been discovered. Therefore, for sometime there has been a need to develop materials exhibiting excellent metachromatism.

The applicant has already proposed reversible thermochromic materials which exhibit a metachromatism within a temperature range of from minus several ten of degrees centigrade to about 100° C. These materials make it possible to select the desired color (see U.S. Pat. No. 4,028,118, corresponding to British Pat. No. 1,405,701, French Patent 73 19876, and German Pat. (OLS) No. 2,327,723). These thermochromic materials provide deeper color at temperatures below the temperatures at which they undergo the metachromatism (i.e., below the temperature of coloration/decoloration) than the color at temperatures above the temperatures of coloration/decoloration thereof. (These thermochromic materials described in U.S. Pat. No. 4,028,118 are referred to "a lower temperature side coloring type" thermochromic material.)

The present invention is intended to provide reversible thermochromic materials which provide deeper color at temperatures above the temperatures of coloration/decoloration than the color at temperatures below the temperature of coloration/decoloration. (The thermochromic materials mainly intended by the present invention are referred to "a higher temperature side coloring type" thermochromic material.) However, the materials of the invention are equal to the above thermochromic materials in that they exhibit metachromatism within the abovedescribed temperature range and provide the desired color. The higher temperature side coloring type reversible thermochromic materials of the invention make up for the deficiency of the above-described lower temperature side coloring type thermochromic materials. This increases the value and the possible uses of the materials of the invention.

Investigations have been carried out on the phenomenon of coloration/decoloration resulting from the reaction of electron-donating, chromatic, colorless organic compounds with acidic phosphoric acid ester compounds. As a result of these investigations, it has been found that the metachromatism proceeds thermally reversibly. Based on the discovery that such reversible metachromatism occurs due to a relatively large dependency on the temperature of acid-dissociation of acidic phosphoric acid ester compound, further study was continued and, as a result, it has been found that the coloring type and the temperature of coloration/decoloration at which the reversible thermochromic material undergoes a metachromatism are determined by physical properties of acidic phosphoric acid ester compound, such as molecular weight, melting point, solidifying point, and oxidiation.

Furthermore, it has been found that the use of one or more compounds selected from the group consisting of alcohols, esters, ketones, ethers, acid amides, and carboxylic acids in combination permits production of thermochromic materials which are more useful and practical. More specifically, the use of one or more compounds selected from the group consisting of alcohols, esters, ketones, ethers, acid amides, and carboxylic acids in combination causes coloration/decoloration to occur over wider temperature ranges and more delicately. This alternation in color proceeds sharply and sensitively, and reversibly from colorless to transparent color, from Color (I) to Color (II), or from color to transparent colorless. Furthermore, the reversible thermochromic material of the invention has the ability to cover or reveal the background.

SUMMARY OF THE INVENTION

It is the primary object of the present invention to provide a reversible thermochromatic material comprising (A) an electron-donating, chromatic, colorless organic compound, and (B) one or more compounds selected from acidic phosphoric acid ester compounds and their metal salts.

Another object is to present reversible thermochromic material which can be used in combination with other known materials in order to increase the possible uses of such materials.

DETAILED DESCRIPTION OF THE INVENTION

The conventional reversible thermochromatic material comprises an electron-donating compound, a specific electron-accepting compound, and an agent which can interchangeably donate or accept an electron. It has been found that when electron-donating chromatic colorless organic compounds such as leuco dyes are used in combination with those compounds having markedly large electron-acceptability, the donation and acception of electrons do not proceed reversibly. Furthermore, it has also been found that even if the agent which causes the reversible donation and acception of electrons is used, the reaction does not proceed reversibly. Based on these findings, it has been believed that acidic phosphoric acid ester compounds belong to the compounds of that kind. However, the present inventors have found that the acid dissociation of the acidic phosphoric acid ester compounds is not so large, and the acidic phosphoric acid ester compound is one of the compounds having high acid dissociation properties which permit the reversible donation and acception of electrons. Based on the above findings, it has been found that when acidic phosphoric acid ester compounds are used as electron-accepting compounds, the metachromatism can be caused to proceed reversibly. As a result of further investigations, it has been found that when leuco dyes and acidic phosphoric acid ester compounds are used, the higher temperature side coloring type metachromatism proceeds reversibly at temperature range of 40° to 120° C. This higher temperature side coloring type methachromatism could not be attained by the lower temperature side coloring type thermochromic materials of U.S. Pat. No. 4,028,118. This is an unexpected effect.

In the thermochromic material of the invention, as Component (C), one or more compounds selected from the group consisting of alcohols, esters, ketones, ethers, acid amides, and carboxylic acids are used in combination. The use of Component (C) in combination offers advantages in obtaining a thermochromic material which exhibits a more delicate metachromatism over wider temperature ranges, and that there can be obtained (i) a metachromatism of the higher temperature side coloring type wherein the deeper color can be obtained at temperature higher than the temperature of coloration/decoloration, and (ii) a metachromatism of the two-color type wherein the material turns in color from Color (I) to Color (II) at below and above the temperature of coloration/decoloration. More specifically, when using one or more compounds selected from alcohols, or at least one alcohol in combination with a compound selected from esters, ketones, ethers, acid amides, and carboxylic acids as Component (C), there can be obtained a composition which undergoes a higher temperature side coloring type metachromatism at a number of different temperatures of coloration/decoloration within the temperature range of from −50° C. to 100° C. However, when Component (C) is comprised of one or more compounds selected from esters, ketones, ethers, acid amides, and carboxylic acids, there can be obtained a thermochromic material which exhibits a lower temperature side coloring type metachromatism or two-color metachromatism although it does not exhibit a high temperature side coloring type metachromatism.

The study by the inventors has revealed that Component (C) has a so-called coloration/decoloration temperature-adjusting action, and that the temperature of coloration/decoloration of a composition comprising Components (A) and (B) is determined mainly by Component (B). The use of Component (C) in combination therewith makes it possible to adjust at will the melting point or solidifying point of the resulting composition. This is advantageous in that it makes it possible to obtain a thermochromatic material which undergoes metachromatism at the desired temperature.

The composition of the invention comprises (A) an electron-donating chromatic colorless organic compound and (B) one or more compounds selected from acidic phosphoric acid ester compounds and their metal salts, or alternatively, further contains (C) one or more compounds selected from the group consisting of alcohols, esters, ketones, ethers, acid amides, and carboxylic acids. This composition undergoes metachromatism within the temperature range of from −50° C. to 120° C. which is ordinarily used in everyday life. Furthermore, one of the advantageous features of the invention is that it is possible to cause the metachromatism at temperatures lower than 0° C., particularly at temperatures of minus several ten of degrees centigrade (°C.). This has never been attained by conventional thermochromatic material. The invention, therefore, greatly contributes to stability and convenience in that it permits the use of thermochromatic material in fields where low temperatures are employed.

The greatest feature of the invention is that the combination of the temperature of coloration/decoloration and the type of color can be selected at will. That is, the color can be determined by appropriately selected Component (A), the intensity of color and the temperature of coloration/decoloration can be determined by appropriately selecting Component (B). Furthermore, by using Component (C) in combination, the metachromatism can be caused to occur within wider temperature ranges. When using conventional thermochromatic materials, it is necessary to look for a previously synthesized substance in order to find a substance which provides the desired color and temperature of coloration/decoloration. Alternatively, it may be necessary to wait for those substances to be synthesized. However, the thermochromatic material of the present invention has a very high degree of freedom with respect to selecting such materials. Furthermore, the thermochromatic material of the invention is different from the conventional thermochromatic material in that the metachromatism proceeds reversibly from colorless to color, from color to colorless, or from Color (I) to Color (II). Furthermore, the colors are very distinguishable. It is also possible to induce the metachromatism reversibly from Color (I) to Color (II) by adding the usual dyes and pigments which do not undergo the coloration/decoloration even by heating the thermochromatic material. Furthermore, it is one of the features of the invention that light can be transmitted or shielded.

The ratio of the components in the invention varies depending on the intensity of color, the temperature of coloration/decoloration, the form of coloration/decoloration, and the type of the compound used for each component. In general, the desired characteristics can be obtained when Components (B) and (C) are from 1/10 to 50 parts by weight and from 1 to 800 parts by weight, respectively, per 1 part by weight of Component (A). Each of the Components (A), (B) and (C) may be comprised of two or more compounds used in combination. In order to increase the performance, it is possible to include additives with the thermochromatic material. Typical examples of such additives include antioxidants, antiaging agents, ultraviolet absorbers, dissolution aids, diluents, and sensitization aids.

Electron-donating chromatic colorless organic compounds (i.e., Component (A)) as used herein include diaryl phthalides, indolyl phthalides, polyaryl carbinoles, leuco auramines, acyl auramines, aryl auramines, Rhodamine B lactam, indolines, spiropyrans, and fluorans. Preferred compounds are listed below:

Crystal Violet lactone, Malachite Green lactone, Michler's hydrol, Crystal Violet carbinol, Malachite Green carbinol, N-(2,3-dichlorophenyl)leuco auramine, N-benzoyl auramine, Rhodamine B lactam, N-acetylauramine, N-phenyl auramine, 2-(phenyliminoethylidene)-3,3-dimethylindoline, N-3,3-trimethylindolinobenzospiropyran, 8-methoxy-N-3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benzo-6-diethylaminofluoran, 3,6-di-p-toluidino-4,5-dimethylfluoran-phenylhydrazido-γ-lactam, 3-amino-5-methylfluoran, 2-methyl-3-amino-6,7-dimethylfluoran, 2,3-butylene-6-di-n-butylaminofluorane, 3-diethylamino-7-anilinofluoran, 3-diethylamino-7-(paratoluidino)fluoran, 7-acetamido-3-diethylaminofluoran, 2-bromo-6-cyclohexylaminofluoran, 2,7-dichloro-3-methyl-6-n-butylaminofluoran, 3-diethylamino-6-methyl-7-dibenzylaminofluoran, 3-diethylamino-6-methyl-7-anilinofluoran, 3,3-bis(1-n-butyl-2-methylindol-2-yl)phthalide, 3,3-bis(1-ethyl-2-methylindol-3-yl)phthalide, and 3-(4-dimethylaminophenyl)-3-(1,2-dimethylindol-3-yl)-phthalide.

Acidic phosphoric acid ester compounds (i.e., Component (B)) include those compounds of the following general formula (I):

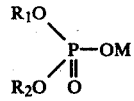

wherein $R_1$ and $R_2$, which may be the same or different, each represents hydrogen, an alkyl group having from 1 to 22 carbon atoms, a branched alkyl group having from 3 to 20 carbon atoms, an alkenyl group having from 3 to 20 carbon atoms, a cycloalkyl group having from 5 to 24 carbon atoms or an aryl group having from 6 to 20 carbon atoms in proviso that $R_1$ and $R_2$ do not represent hydrogen at the same time, and M represents hydrogen or a metal atom. These acidic phosphoric acid ester compounds may be monoesters, diesters or mixtures thereof. Preferred examples of such acidic phosphoric acid ester compounds are given below (in the following compounds, a mixture of a monoester and a diester is called an "acid phosphate").

Methyl acid phosphate, ethyl acid phosphate, n-propyl acid phosphate, n-butyl acid phosphate, 2-ethylhexyl acid phosphate, n-octyl acid phosphate, isodecyl acid phosphate, n-decyl acid phosphate, lauryl acid phosphate, myristyl acid phosphate, cetyl acid phosphate, stearyl acid phosphate, docosyl acid phosphate, oleyl acid phosphate, 2-chloroethyl acid phosphate, 2,3-dibromopropyl acid phosphate, 2,3-dichloropropyl acid phosphate, cyclohexyl acid phosphate, phenyl acid phosphate, o-tolyl acid phosphate, 2,3-xylyl acid phosphate, p-cumenyl acid phosphate, mesityl acid phosphate, 1-naphthyl acid phosphate, 2-naphthyl acid phosphate, 1-anthryl acid phosphate, benzyl acid phosphate, phenethyl acid phosphate, styryl acid phosphate, cinnamyl acid phosphate, trityl acid phosphate, phenylmethyl phosphate, phenylethyl phosphate, phenyl-n-propyl phosphate, phenyl-n-butyl phosphate, phenyl-n-octyl phosphate, phenyllauryl phosphate, phenylcyclohexyl phosphate, phenyl(2,3-xylyl) phosphate, cyclohexylstearyl phosphate, cyclohexylcetyl phosphate, dimethyl phosphate, diethyl phosphate, di-n-propyl phosphate, di-n-butyl phosphate, di-n-hexyl phosphate, di(2-ethylhexyl) phosphate, di-n-decyl phosphate, dilauryl phosphate, dimyristyl phosphate, dicetyl phosphate, distearyl phosphate, dibehenyl phosphate, diphenyl phosphate, dicyclohexyl phosphate, di-o-tolyl phosphate, bis(diphenylmethyl) phosphate, bis(triphenylmethyl) phosphate, di(2,3-xylyl) phosphate, dibenzyl phosphate, and di(1-naphthyl) phosphate.

Metals constituting the metal salts of the acidic phosphoric acid ester compounds are sodium, potassium, lithium, calcium, zinc, zirconium, aluminum, magnesium, nickel, cobalt, tin, copper, iron, vanadium, titanium, lead, molybdenum, etc. These metal salts of the acidic phosphoric acid ester compounds can be prepared by various techniques, e.g., a method in which acidic phosphoric acid ester compounds are reacted with an oxide or hydroxide of the desired metal, and a composite decomposition method in which acidic phosphoric acid ester alkali salts and chlorides of the desired metals are used.

The Component (C), i.e., the compound selected from alcohols, esters, ketones, ethers, acid amides and carboxylic acids, is explained in more detail.

Alcohols include aliphatic monohydric alcohols having from 4 to 31 carbon atoms, alicyclic monohydric alcohols having from 5 to 10 carbon atoms, aromatic monohydric alcohols having from 7 to 9 carbon atoms, polyhydric alcohols having from 2 to 6 carbon atoms and from 2 to 5 hydroxyl groups, polyethylene glycol having a molecular weight of from 200 to 20,000 and sugar alcohols. Preferred examples are given below:

n-Hexyl alcohol, n-octyl alcohol, n-nonyl alcohol, n-decyl alcohol, n-lauryl alcohol, n-myristyl alcohol, n-cetyl alcohol, n-stearyl alcohol, n-eicosyl alcohol, n-docosyl alcohol, n-melissyl alcohol, isocetyl alcohol, isostearyl alcohol, isodocosyl alcohol, oleyl alcohol, cyclohexyl alcohol, cyclopentyl alcohol, benzyl alcohol, cinnamyl alcohol, triethylene glycol, polyethylene glycol having a molecular weight of from 6,000 to 20,000, propylene glycol, hexylene glycol, cyclohexane-1,4-diol, trimethylolpropane, 1,2,6-hexanetriol, pentaerythritol, mannitol, etc.

Esters include monocarboxylic acid (having from 2 to 22 carbon atoms) esters of aliphatic monohydric alcohols having from 1 to 22 carbon atoms, phenols having from 6 to 18 carbon atoms or polyhydric alcohols having from 2 to 6 carbon atoms and from 2 to 5 hydroxyl groups; polycarboxylic acid (having from 2 to 12 carbon atoms and from 2 to 4 carboxyl groups) esters of aliphatic monohydric alcohols having from 1 to 22 carbon atoms; aromatic sulfonic acid esters having from 8 to 24 carbon atoms; aliphatic sulfonic acid esters having from 8 to 20 carbon atoms; and phosphoric acid triesters of aliphatic monohydric alcohols having from 2 to 18 carbon atoms or phenols having from 6 to 15 carbon atoms.

Preferred examples of monocarboxylic acid esters are shown below:

Octyl acetate, butyl propionate, octyl propionate, phenyl propionate, amyl caproate, ethyl caprylate, ethyl caprate, octyl caprate, ethyl laurate, butyl laurate, hexyl laurate, octyl laurate, dodecyl laurate, myristyl laurate, stearyl laurate, methyl myristate, butyl myristate, hexyl myristate, octyl myristate, lauryl myristate, cetyl myristate, stearyl myristate, butyl palmitate, hexyl palmitate, octyl palmitate, dodecyl palmitate, myristyl palmitate, cetyl palmitate, stearyl palmitate, methyl stearate, butyl stearate, hexyl stearate, octyl stearate, lauryl stearate, myristyl stearate, cetyl stearate, stearyl stearate, propyl behenate, butyl behenate, ethyl benzoate, butyl benzoate, amyl benzoate, phenyl benzoate, methyl oleate, butyl oleate, 12-hydroxy stearic acid triglyceride, methyl 12-hydroxy stearate, castor oil, etc.

Preferred examples of polycarboxylic acid esters are shown below:

Dibutyl oxalate, diethyl malonate, dibutyl malonate, dibutyl tartrate, dibutyl sebacate, dimethyl phthalate, dibutyl phthalate, dioctyl phthalate, diethyl maleate, dibutyl maleate, tristearyl citrate, etc.

Preferred examples of aromatic sulfonic acid esters and aliphatic sulfonic acid esters are shown below:

Ethyl benzene sulfonate, propylbenzene sulfonate, propyl toluenesulfonate, butyl toluenesulfonate, phenyl benzenesulfonate, phenyl toluenesulfonate, phenyl dodecylbenzenesulfonate, butyl naphthalenesulfonate, butyl octylsulfonate, butyl dodecylsulfonate, octyl dodecylsulfonate, etc.

Preferred examples of phosphoric acid triesters are given below:

Tributyl phosphate, tristearyl phosphate, diphenyl monocresyl phosphate, tricresyl phosphate, triphenyl phosphate, diphenyl decyl phosphate, diphenyl 2-ethylhexyl phosphate, tris(2-chloroethyl) phosphate, tris(2,3-dibromopropyl) phosphate, tristearyl phosphate, etc.

Ketones include aliphatic ketones having from 5 to 35 carbon atoms and aromatic ketones having from 8 to 13 carbon atoms. Preferred examples are shown below:

Ethyl butyl ketone, methyl hexyl ketone, mesityl oxide, cyclohexanone, acetophenone, propiophenone, benzophenone, 2,4-pentanedione, acetonyl acetone, diacetone alcohol, ketone wax, stearone, etc.

Ethers include aliphatic ethers having from 8 to 36 carbon atoms and aromatic ethers having from 12 to 20 carbon atoms. Preferred examples of such ethers are shown below:

Hexyl ether, myristyl ether, lauryl ether, stearyl ether, phenyl ether, isopropyl benzyl ether, ethylene glycol diphenyl ether, diethylene glycol diethyl ether, etc.

Acid amides include fatty acid amides having from 2 to 22 carbon atoms and their N-alkyl-substituted derivatives. Preferred examples of such compounds are shown below:

Acetamide, propionamide, capronamide, caprylamide, capramide, lauramide, myristamide, palmitamide, stearamide, behenamide, erucamide, N-ethyl palmitamide, N-butyl myristamide, N-butyl oleamide, etc.

Carboxylic acids include aliphatic mono-carboxylic acid having from 6 to 22 carbon atoms, aliphatic polycarboxylic acids having 3 to 12 carbon atoms, aromatic monocarboxylic acids having from 7 to 11 carbon atoms, and aromatic polycarboxylic acids having from 8 to 14 carbon atoms. Preferred examples of such carboxylic acids are shown below:

Capronic acid, caprylic acid, capric acid, lauric acid, myristic acid, palmitic acid, stearic acid, behenic acid, oleic acid, elaidic acid, linoleic acid, linolenic acid, hydroxypropionic acid, ricinoleic acid, 12-hydroxystearic acid, pyruvic acid, malonic acid, succinic acid, adipic acid, sebacic acid, malic acid, maleic acid, fumaric acid, naphthenic acid, benzoic acid, toluic acid, phenylacetic acid, p-tert-butyl benzoic acid, cinnamic acid, bromobenzoic acid, mandelic acid, α-resorcylic acid, β-resorcylic acid, γ-resorcylic acid, gallic acid, hydroxy naphthoic acid, phthalic acid, trimellitic acid, pyromellitic acid, etc.

Many of the reversible thermochromic materials of the invention are, as described hereinbefore, liquid at room temperature, or become liquid on heating for the purpose of causing a metachromatism. This disadvantage (the material being liquid or becoming liquid on heating) can be eliminated by enclosing the composition in microcapsules by known microencapsulation techniques. Thus, the microencapsulated thermochromic material becomes more useful.

Another advantage is that even though different thermochromic materials undergoing a metachromatism at different temperatures, forming different colors are placed near each other, they maintain the ability to exhibit metachromatism independently. This will hereinafter be explained in detail.

When two thermochromic materials are used (1) a thermochromic material which turns from colorless to green at 10° C., and (2) a thermochromic material which turns from colorless to red at 30° C., if the two materials are merely mixed, the resulting material will turn black over temperatures of from 10° to 30° C. This indicates that the sensitivity of coloration/decoloration is poor. On the other hand, if the thermochromic materials (1) and (2) are occuluded in microcapsules having a size of 30 μm or less and, thereafter, are mixed together, the resulting material will be colorless at 10° C. or lower, turn green at 10° to 30° C., and turn from green to black at 30° C. or higher. When the resulting material is cooled from 30° C. or higher, it will turn from black to green, and then from green to colorless.

More complicated alternations in color can be attained using the above principle. Furthermore, the alternation is highly sensitive. This is because the microencapsulated thermochromic materials act independently. Furthermore, since the thermochromic materials are protected by capsule walls, even if they are brought into contact with each other or with other substances of high reactivity, the thermochromic properties thereof are not deteriorated. Therefore, their field of application is greatly broadened. For example, even if they are brought into contact with chemically active substances, e.g., acidic substances, alkaline substances, and peroxides, no reduction in the thermochromic performance thereof occurs.

Microencapsulation can be performed by any conventional technique, such as an interfacial polymerization method as described in U.S. Pat. No. 3,429,827 and 3,167,602, an in situ polymerization method as described in British Pat. No. 989,264, an orifice method as described in U.S. Pat. No. 3,015,128, a coacervation method using an aqueous solution system as described in U.S. Pat. No. 2,800,457 and 3,116,206, a coacervation method using an organic solvent solution system as described in U.S. Pat. No. 3,173,872, a meltable dispersion method as described in U.S. Pat. No. 3,161,602, an air suspending coating method as described in U.S. Pat. No. 3,202,533, a spray drying method as described in U.S. Pat. No. 3,016,308, and the like. These conventional techniques can be chosen appropriately depending on the purpose for which the thermochromic material is used.

Microcapsules used in the present invention have a size of 30 μm or less, preferably 2 to 30 μm and most preferably 5 to 15 μm.

If desired, the thermochromic material and microencapsulated thermochromic material can be used in combination with substances such as polymers, antioxidants, anti-aging agents, ultraviolet ray absorbers, dissolution aids, and diluents.

The use of the thermochromic material or microencapsulated thermochromic material in combination with polymers is explained below.

Thermochromic materials or microcapsules containing thermochromic materials can be homogeneously added to polymers without the deterioration of their inherent characteristics in order to prepare reversible thermochromic polymer compositions. That is, thermoplastic reversible thermochromic polymers can be obtained by heat melting thermoplastic polymers and kneading them homogeneously. However, thermosetting polymers may be homogeneously mixed and thereafter polymerized by a hardener, a catalyst, heat or the like to obtain thermosetting reversible thermochromic polymers.

These polymers can be shaped into the desired form having a metachromatism, e.g., a block, a film, a filament, a fine particle, a rubber-like elastomer, and a liquid.

These polymers will hereinafter be explained in greater detail.

(1) Uniform incorporation of the thermochromatic material into polyethylene, polypropylene, polystyrene, polymethyl methacrylate, unsaturated polyesters, epoxy resins, acryl resins, polyurethane or the like provides a translucent or transparent block exhibiting metachromatism.

(2) Uniform incorporation of the thermochromic material into polyethylene, polyvinlyidene chloride, ionomers or the like provides a film exhibiting metachromatism.

(3) When the thermochromatic material is uniformly mixed with polypropylene, polyamide or the like, there is obtained a filament exhibiting metachromatism.

(4) When the thermochromatic material is uniformly mixed with polyethylene, polyvinyl acetal or the like, there are obtained fine particles exhibiting metachromatism.

(5) A rubber-like elastomer exhibiting metachromatism is obtained by uniformly mixing the thermochromatic material with butyl rubber, polyisobutylene, an ethylene-propylene copolymer or the like.

(6) A liquid exhibiting metachromatism is obtained by uniformly mixing the thermochromatic material with polybutene, polyisobutylene or the like.

The material in the above-described forms can be used for molding, film-forming, spinning, coating, binding or the like.

When incorporating the thermochromic material into the polymer, the amount of the thermochromic material required to provide the desired thermochromatic properties can vary over a wide range. The amount varies substantially depending on the type of polymer and the use of the polymer.

To provide the desired characteristics, the amount of the thermochromic material being added is sufficient if it is from about 0.1 to about 40% by weight based on the weight of the polymer composition, with the amount of from about 0.5 to about 20% by weight being preferred. In addition, suitable additives can be added to the composition of the invention in order to improve the polymer composition. Typical examples of such additives include antioxidants, ultraviolet absorbers, inorganic fillers, pigments, lubricants, plasticizers, antistatic agents, and antiblocking agents.

Polymers which are used in the invention include:

hydrocarbon resins, e.g., polyethylene, polypropylene, polybutene, polyisobutylene, polystyrene, a cumarone-indene resin, a terpene resin, and an ethylenepropylene copolymer;

acryl resins, e.g., polymethyl acrylate, polyethyl acrylate, polybutyl acrylate, polymethyl methacrylate, polyethyl methacrylate, and polyacrylonitrile;

vinyl acetate resins and their derivatives, e.g., polyvinyl acetal, polyvinyl butyral, a vinyl acetate-vinyl chloride copolymer, and a vinyl acetateethylene copolymer;

halogen-containing resins, e.g., polyvinyl chloride, polyvinylidene chloride, chlorinated polyethylene, and chlorinated polypropylene;

diene-based polymers, e.g., butadiene-based synthetic rubber, chloroprene-based rubber, and isoprene-based rubber;

polyester resins, e.g., a saturated alkyd resin, a Glyptal resin, a terephthalic resin, an unsaturated polyester resin, an allyl resin, and polycarbonate; and a polyamide resin, a silicon resin, polyvinyl ether, a furan resin, an epoxy resin, a polyurethane resin, a melamine resin, a polyurea resin, and a methaxylene resin.

In order to increase the stability of the thermochromatic material, antioxidants, anti-aging agents, and ultraviolet absorbers can be added.

Examples of such antioxidants and anti-aging agents include 2,4,6-tri-tert-butylphenol, 2,2-methylenebis(4-methyl-6-tert-butylphenol), 4,4-isopropylidenebisphenol, 2,6-bis(2-hydroxy-3-tert-butyl-5-methylbenzyl)-4-methylphenol, 4,4-thiobis(3-methyl-6-tertbutylphenol), 2,2,4-trimethyl-1,2-dihydroquinoline, thiobis(β-naphthol), and mercaptobenzimidazole.

Ultraviolet absorbers include benzophenone-, salicylate-, benzotriazole-, and substituted acrylonitrilebased absorbers. Examples include 2,4-dihydroxybenzophenone, 2-hydroxy-4-octoxybenzophenone, phenyl salicylate, para-tert-butylphenyl salicylate, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-4'-octaxyphenyl)benzotriazole, and 2-ethylhexyl-2-cyano-3-phenyl cinnamate.

Dissolution aids and diluents include high boiling point aromatic hydrocarbon solvents, e.g., triaryldimethane, alkylnaphthalene, alkylbenzene, and biphenyls, etc., fluid paraffin, chlorinated paraffin, microcrystalline wax, paraffin wax, petroleum ceresin, and fluorocarbon oil.

The thermochromatic material of the invention can be used in various applications, for example, (1) a thermochromatic printing ink, (2) a thermochromatic writing instrument, (3) a thermochromatic paint, (4) a thermochromatic sheet, and (5) a thermochromatic wrapping material.

(1) Thermochromatic inks can be prepared by dissolving or dispersing thermochromic materials or microencapsulated thermochromatic materials in printing ink vehicles. By partially or entirely printing these printing inks on supports, e.g., a paper, synthetic paper, plastic films, cloth, and metallic plates, by known printing techniques, excellent and useful thermochromatic printed materials can be obtained without deterioration of the inherent thermochromatic characteristics of the thermochromatic materials.

These thermochromatic printed materials change their colors according to changes in temperature, and therefore, they can be used as ordinary household materials or industrial materials with or without application of additional processings.

Using the thermochromatic materials or microencapsulated thermochromatic materials of the invention, a variety of printing inks can be prepared. The inks include the cooling-solidifying type, evaporation-drying type, permeation-drying type, precipitation-drying type, gelation-drying type, oxidative polymerization type, and thermosetting type printing inks. These printing inks contain vehicles such as a natural resin, a modified natural resin, a synthetic resin, a wax, and a solvent.

In preparing printing inks using the thermochromatic materials or microencapsulated thermochromatic materials of the invention, the amount of the thermochromic material necessary to obtain the desired thermochromic properties can be changed over a wide range. The amount of the thermochromic material varies depending on the type of vehicle and the use of the printing ink. Usually the amount of the thermochromic material used is sufficient to be from about 1 to about 50% by weight, preferably from about 5 to about 40% by weight, based on the total weight of the printing ink. Within this range the desired thermochromic properties are significantly exhibited.

Conventional additives used to improve conventional printing inks can be added to the printing ink composition of the invention. Typical examples of such additives include antioxidants, ultraviolet light absorbers, pigments, plasticizers, and antiblocking agents.

Examples of printing ink vehicles which are used in the invention are shown below.

Cooling-solidifying type (wax type):
carnauba wax, paraffin wax, microcrystalline wax, etc., Evaporation-drying type (resin/solvent type):
rosin, maleic acid rosin, shellac, casein, an alkyd resin, cellulose derivatives, petroleum resins, low molecular weight polyethylene, polystyrene, polyvinyl chloride, polyvinyl acetate, polyvinyl alcohol, petroleum solvents, aromatic solvents, alcohols, ketones, esters, water, etc., Permeation-drying type (resin/petroleum solvent):
rosin, rosin derivatives, machine oil, spindle oil, kerosine, etc., Gelation-drying type (emulsion type):
vinyl copolymer latex, synthetic rubber latex, etc., Gelation drying type (resin/solvent type):
an alkyd resin, modified rubber, petroleum solvent, etc.

Oxidation-polymerization type (drying oil type):
polymerized linseed oil, tung oil, dehydrated castor oil, oiticica oil, etc., Oxidation-polymerization type (oil-modified alkyd type):
soybean oil-modified alkyd resin, coconut oil-modified alkyd resin, linseed oil-modified alkyd resin, etc., Thermosetting type (thermosetting resin type): P epoxy resin, amino resin, heat-reaction type unsaturated hydrocarbon resin, etc.

Depending on the type of material to be printed, resins may not be required. By applying such printing inks by letterpress printing, intaglio printing, lithographic printing, screen printing and so forth, the desired printed material can be prepared.

(2) Thermochromic writing instruments such as a felt pin, a ballpoint pen and a coloring material can be prepared using a liquid material which is prepared by dissolving or dispersing the thermochromatic material or microencapsulated thermochromatic material of the invention in a solvent. Alternatively, writing instruments such as a crayon and a pencil can be prepared using a solid material which is prepared by solidifying the thermochromatic material or microencapsulated thermochromatic material by the use of a suitable vehicle. In preparing such writing instruments, the thermochromic characteristics of the present thermochromic material are not deteriorated at all.

Such thermochromic writing instruments can be used to write letters, figures, patterns, and the like on paper, synthetic paper, plastic films, cloth, metallic plates, and wooden plates. Such letters, figures and patterns form a variety of colors when the temperature is changed. Therefore, the thermochromatic writing materials can be used in applications where pleasure, amusement or magic effects caused by the alternation in color are valued. Also, they can be used as temperature-indicating writing instruments.

When preparing writing inks for use in the above-described writing instruments, the amount of the thermochromic material added can be changed over wide ranges, and it varies depending on the type of the ink vehicle and the use of the writing instrument. Usually the amount of the thermochromic material added is sufficient to be from about 1 to about 50% by weight based on the total weight of the writing ink, within which range the desired thermochromic properties are significantly obtained.

Vehicles which are used for the preparation of solid writing instruments include n-paraffin, isoparaffin, dibenzylbenzene, terphenyl, stearic acid amide, metallic soap, carnauba wax, bees wax, Japan wax, white Japan wax, insect wax, montan wax, and various polymeric compounds.

However, when Component (C) is docosyl alcohol, eicosyl alcohol, stearyl alcohol, cetyl alcohol, polyethylene glycol (molecular weight of 6,000 to 20,000) or the like, the use of a vehicle may be unnecessary.

Organic solvents which are used in dissolving or dispersing the above-described three components include ethyl alcohol, propyl alcohol, butyl alcohol, octyl alcohol, methyl acetate, ethyl acetate, butyl acetate, dibutyl phthalate, acetone, methyl ethyl ketone, methyl isobutyl ketone, toluene, xylene, triethylene glycol, hexylene glycol, and ethylene glycol monoethyl ether.

In some cases, no solvent is needed when Component (C) is octyl alcohol, isocetyl alcohol, isostearyl alcohol, benzyl alcohol, hexylene glycol, dibutyl phthalate, isoamyl butyrate, cyclohexane, diisoamyl ether or the like.

In solid-writing instruments, felt pen type writing instruments, etc., binders may be added to improve writing performance. Such binders include ethyl cellulose, nitrocellulose, polyvinyl acetate, polyvinyl butyral, vinyl chloride-vinyl acetate copolymers, polyacrylates, ketone resins, petroleum resins, indene resins, terpene resins, and rosin ester resins.

In addition, in order to improve writing performance, additives ordinarily used in the field can be added, including antioxidants, ultraviolet absorbers, thermal stabilizers, lubricants, and reinforcing agents.

(3) Thermochromic paints can be prepared by dissolving or dispersing the thermochromic materials or microencapsulated thermochromic materials of the invention in painting vehicles. These thermochromic paints can be coated on paper, synthetic paper, plastics, cloth, metals, porcelain, glass, and wood. The thus coated surface forms a variety of colors when changing the temperature. Therefore, the thermochromic paints can be used in fields where pleasure, amusement or magic effects caused by the alternation in color are valued. In addition, they can be used as coatings for temperature-indicating writing instruments.

As described above, the thermochromic material or microencapsulated thermochromic material of the invention is dissolved or dispersed in a vehicle comprising a natural resin, a modified natural resin, a synthetic resin, a solvent and the like to prepare the thermochromic paint. The amount of the thermochromic material used in the preparation of the thermochromic paint can be changed over wide ranges although it varies depending on the type of the vehicle and the field of use. Usually, the amount of the thermochromic material used is from about 1 to about 50% by weight based on the total weight of the paint, with a range of from about 5 to 40% by weight being preferred.

Conventional additives usually employed to improve conventional paints can be added to the thermochromic paint. Such additives include plasticizers, drying accelerators, tackifiers, ultraviolet abosrbers, and flattening agents.

The composition of the painting vehicle as used herein will hereinafter be explained.

Resins which can be used include modified alkyd resins, unsaturated polyester resins, phenol resins, epoxy resins, polyurethane resins, cellulose resins, hydrocarbon resins, vinyl acetate resins, butyral resins, vinyl chloride resins, vinyl chloride-vinyl acetate copolymer resins, acryl resins, natural or synthetic rubbers, emulsions, e.g., polyvinyl acetate emulsions, styrene-butadiene latex, acryl emulsion, styrene-acryl emulsion, water-soluble resins, e.g., polyvinyl alcohol, polyvinylmethyl ether, water-soluble amino resins, water-soluble acryl resins, shellac soluble in aqueous alkali solutions, zein, casein, and styrene-maleic acid copolymeric resins.

Solvents which can be used include aliphatic hydrocarbons, aromatic hydrocarbons, halogenated hydrocarbons, alcohols, ketones, esters, ethers, ether alcohols, ketone alcohols, ketone ethers, ketone esters, ester ethers, and water.

There compounds may be used singly or in combination with each other depending on the application in which the resulting painting vehicle is used.

As described above, the thermochromic paint is prepared by appropriately selecting the vehicle depending on the type of the thermochromic material and the use of the thermochromic paint. The thus-prepared thermochromic paint can be coated by various techniques, such as brush coating, cold spray coating, hot spray coating, dip coating, flow coating, roller coating, and curtain flow coating, to produce the desired coated article.

(4) Thermochromic sheets can be prepared by laminating a thermochromic layer containing the thermochromic material or microencapsulated thermochromic material of the invention on a backing material, and if desired, by providing a protective layer on the thermochromic layer. Such thermochromic sheets can be used as ordinary household materials or industrial materials with or without application of additional processings.

In order to produce the above laminate structure comprising the thermochromic layer containing the thermochromic material of the invention, the backing material, and the protective layer, it is necessary to adhere the thermochromic material onto the backing material by a suitable technique.

Such lamination can be performed, for example, by a method in which the thermochromic material or microencapsulated thermochromic material of the invention is added to a polymeric substance. The resulting mixture is formed into a film, a filament or the like, and the film, filament or the like is then heat-pressed onto the backing material, or is laminated on the backing material using a suitable binder, e.g., a natural resin, a synthetic resin, and a wax. Alternatively, a paint containing the thermochromic material or microencapsulated thermochromic material of the invention can be coated on the backing material to prepare the laminate. In addition, lining techniques such as flow dipping can be utilized.

The thermochromic layer can also be prepared by dissolving or dispersing the thermochromic material or microencapsulated thermochromic material of the invention in a printing ink vehicle to prepare a printing ink, and then, by printing or coating the thus-prepared printing ink by appropriate techniques such as letterpress printing, intaglio printing, lithographic printing, screen printing, and the like.

With regard to the thermochromic polymer, thermochromic material, and thermochromic printing ink as used herein, the objects can be attained by utilizing the above-described invention.

Backing materials which can be used include paper, cloth, plastics, wooden pieces, glass, porcelain, stone, metal and the like. They act as supports for the thermochromic layer and the protective layer, and can be provided with decorations such as patterns, pictures and photographs, and marks such as figures and letters. Furthermore, depending on the purpose for which the thermochromic sheet is used, an adhesive layer may be provided on the backing material or metal plating, metal deposition or the like may be applied onto the backing material.

The protective layer is typically a film made of polyethylene, polypropylene, polystyrene, styrenebutadiene copolymers, polyesters, polyvinyl chloride, polyvinyl acetate, polyvinyl butyral, polyacrylates, polyvinyl ethers, polyvinyl alcohol, nitrocellulose, ethylcellulose, hydroxypropyl cellulose, acetyl cellulose, starch, casein or the like. Depending on the purpose for which the thermochromic sheet is used, it may be either transparent or translucent or opaque or colored. The protective layer can be heat bonded directly or after being printed or coated with a printing ink, paint or the like in a conventional fashion. Additionally, the protective layer may be provided with irregularities to yield a source of visual amusement. Addition of additives such as ultraviolet light absorbers, antioxidants, anti-aging agents, and the like to the protective layer provides not only physical protection of the thermochromic layer but also stabilization of weather resistance, etc., of the thermochromic layer. Additionally, as in the case of the backing material, the protective layer may be provided with decorations such as patterns, pictures and photographs, and marks such as figures and letters.

As described above, the thermochromatic layer and the backing material are laminated on each other by the use of a suitable binder, and if desired, the protective layer is provided on the surface of the thermochromic layer to prepare the thermochromic sheet.

The thermochromic sheet exhibits a sharp and reversible metachromatism at any temperature between −50° C. and +120° C. since it contains the thermochromic layer having the characteristics as described above. Therefore, when used in combination with non-thermochromic materials, the thermochromic sheet can be used as a commercially useful material having characteristics such as indication of temperature and information concerning temperature, ornamentation, curiosity, and transmitting or shielding of light.

(5) Thermochromic wrapping materials are prepared by retaining the thermochromic material or a combination of the thermochromic material and additives as described hereinbefore together with a suitable medium in a wrapping material having at least one partial transparent area. In addition, the thermochromic wrapping material can be prepared by holding a medium in a wrapping material containing therein the thermochromic material or a combination of the thermochromic material and other materials as described above.

Furthermore, the above two techniques can be used in combination with each other. Fundamentally they can be classified into the following five groups:

(1) a thermochromic wrapping material in which a liquid or solid thermochromic material is held in a wrapping material;

(2) a thermochromic wrapping material in which a medium is held in a wrapping material, and a liquid or solid thermochromic material is floated or fixed in the medium;

(3) a thermochromic wrapping material in which a first medium is held in a wrapping material, and a mixture prepared by dissolving or dispersing a thermochromic material in a second medium not capable of dissolving the first medium is floated or fixed in the first medium;

(4) a thermochromic wrapping material containing a thermochromic material in which a medium, e.g., gas, liquid and solid, is held in the wrapping material;

(5) a thermochromic wrapping material in which a first medium is held in a wrapping material containing a thermochromic material, and a mixture prepared by dissolving or dispersing a thermochromic material in a second medium not capable of dissolving the first medium and the wrapping material is floated or fixed in the first medium.

These thermochromic wrapping materials can indicate the temperature of the medium contained therein without the deterioration of the thermochromic properties of the thermochromic material, form various colors according to changes in temperature, and transmit or shield light. Utilizing such characteristics, they can be used in various applications.

The invention will be described in detail with reference to the following examples although it is not limited thereto.

Examples 1 to 204 are concerned with thermochromic materials. A fundamental method of production of the thermochromic materials shown in the examples is as follows:

Components (A), (B) and (C) were mixed, and in some cases, additives were added thereto. The resulting mixture was dissolved or melted by heating at about 80° to 100° C. to make it uniform, and on cooling the mixture to room temperature, there was obtained the thermochromic material.

The compositions and the characteristics of the thermochromic materials are shown in Table 1.

Terms and symbols used in Table 1 are as follows:

| Temperature of Coloration/Decoloration and Color | | |
|---|---|---|
| Color below the temperature of coloration/decoloration | Temperature of coloration/decoloration (°C.) | Color above the temperature of coloration/decoloration |

The mark (⇌) indicates that the coloration/decoloration is reversible.

Figures in the Parentheses

Amount of component (g)

Component (A)

Electron-donating, chromatic organic compound

Component (B)

One or more monoesters or diesters of phosphoric acid and their metal salts

Component (C)

One or more alcohols, esters, ketones, ethers, acid amides and carboxylic acids

| Symbols | |
|---|---|
| CVL | Crystal Violet Lactone |
| CF-V | 3-Diethylamino-6-methyl-7-chlorofluoran |
| CF-P | 3-Diethylamino-7,8-benzofluoran |
| CF-R | 3-Diethylaminofluoran-ω-2-chlorophenylimido lactam |
| CF-G | 3-Diethylamino-5-methyl-7-dibenzylaminofluoran |
| CF-O | 3-Chloro-6-cyclohexylaminofluoran |
| CF-RR | 2'-[Bis(phenylmethyl)amino]-3'-methyl-6'-(diethylamino)-spiro]isobenzofuran-1(3H), 9'-[9H]xanthen]-3-one |
| CF-HR | 2'-Chloro-6'-(diethylamino)-spiro[isobenzofuran-1(3H),9'-[9H]xanthen]-3-one |
| CF-IR | 3,3-Bis(1-ethyl-2-methyl-1H—indol-3-yl)-1(3H)-isobenzofuranone |
| CF-1014 | 3'-(Diethylamino)-6',8'-dimethyl-spiro[isobenzofuran-1(3H), 9'-[9H]xanthen]-3-one |
| CF-502P | 3-(1-Ethyl-2-methyl-1H—indol-3-yl)-3-(4-diethylaminophenyl)-1(3H)-isobenzofuranone |
| CF-40P | 3,3-Bis(1-butyl-2-methyl-1H—indol-3-yl)-1(3H)-isobenzofuranone |
| CF-T-121 | 2'-[(4-n-Butylphenyl)amino]-3'-methyl-6'-(diethylamino)-spiro[isobenzofuran-1(3H), 9'-[9H]xanthen]-3-one |
| CF-T-125 | 2'-(Cyclohexylamino)-6'-(diethylamino)-spiro- |

-continued

| Symbols | |
|---|---|
| CF-T-126 | [isobenzofuran-1(3H), 9'-[9H]xanthen]-3-one 6'-(Diethylamino)-2'-[cyclohexyl(phenylmethyl)-amino]-spiro[isobenzofuran-1(3H), 9'-[9H]-xanthen]-3-one |
| CF-T-140 | Leuco compound capable of forming light brown color by donating electron to an acceptor |
| CF-T-150 | 6'(Cyclohexylmethylamino)-3'-methyl-2'-(phenylamino)-spiro[isobenzofuran-1(3H), 9'-[9H]xanthen]-3-one |
| CF-P-3 | 3'-Amino-6'-methyl-spiro[isobenzofuran-1(3H), 9'-[9H]xanthen]-3-one |
| CF-P-5 | 3'-Cyclohexylamino-7'-methyl-spiro[isobenzofuran-1(3H), 9'-[9H]xanthen]-3-one |
| CF-P-6 | 2'-[4-Dimethylaminophenyl(dimethylamino)-methyl-4'-methyl-6'-(diethylamino)-spiro-[isobenzofuran-1(3H), 9'-[9H] xanthen]-3-one |
| CF-P-8 | 4,5,6,7-Tetrachloro-3',6'-bis[methyl(4-n-butylphenyl)amino]-spiro[isobenzofuran-1(3H), 9'-[9H]xanthen]-3-one |
| CF-P-9 | 3'-[(4-Phenylamino)phenylamino]-spiro[56H—benzo[α]xanthene-56, 1'(3'H)-isobenzofuran]-3-one |
| CF-P-10 | 3'-[(4-Ethoxy)phenylamino]-spiro[56H—benzo[α]-xanthene-56, 1'(3'H)-isobenzofuran]-3-one |
| CF-P-12 | 2'-Morpholino-6'-(1-pyrrolidinyl)-spiro-[isobenzofuran-1(3H), 9'-[9H]xanthen]-3-one |
| CF-P-13 | Leuco compound capable of forming brown color by donating electron to an acceptor |
| CF-P-180 | Leuco compound capable of forming black color by donating electron to an acceptor |
| LBT 1812 | Mg salt of stearyl acid phosphate |
| LBT 1820 | Ca salt of stearyl acid phosphate |
| LBT 1830 | Zn salt of stearyl acid phosphate |
| MC-410 | Polyoxyethylene alkyl ether acid phosphate |
| RE-610 | Polyoxyethylene alkylphenol ether acid phosphate |
| UV 328 | 2-(2'-Hydroxy-3'-,5'-di-isoamyl-phenyl)-benzotriazole |
| UV 327 | 2-(3',5'-Di-tert-butyl-2'-hydroxy-phenyl)-5-chlorobenzotriazole |
| UV PS | 2-(2'-Hydroxy-5'-tert-butyl-phenyl)benzo-triazole |
| UV 110 | 2-Hydroxy-4-methoxy benzophenone |
| UV 103 | 2-Hydroxy-4-dodecyloxy benzophenone |
| UV 612NH | [2,2-Thio-Bis(4-t-octylphenolate)]-2-ethyl-hexylamine-Ni(II) |
| UV N35 | Ethyl-2-cyano-3,3-diphenyl acrylate |
| TBS | tert-Butylphenol salicylate |
| WX | 4,4'-Thio-bis(6-tert-butyl-3-methylphenol) |
| AO | Dilauryl thiodipropionate |
| MS | Mixture of isomers of triphenyl dimethane |
| BOS | C.I. Solvent Blue 25 |
| ASY-GRH | C.I. Solvent Yellow 61 |
| Yellow GG | C.I. Pigment Yellow 17 |
| Blue B2G | C.I. Pigment Blue 15:3 |
| VFY 3107 | C.I. Solvent Yellow 25 |

TABLE 1

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 1 | CF-T-126 (1.0) | ethylacid phosphate (20) | — | — | red brown ⇌41 black |
| 2 | " | n-butylacid phosphate (20) | — | — | red brown ⇌43 black |
| 3 | " | 2-ethylhexylacid phosphate (20) | — | — | red ⇌44 black |
| 4 | " | isodecylacid phosphate (20) | — | — | red ⇌45 black |
| 5 | " | laurylacid phosphate (20) | — | — | red ⇌49 black |
| 6 | " | myristylacid phosphate (20) | — | — | red ⇌58 black |
| 7 | " | cetylacid phosphate (20) | — | — | red ⇌65 black |
| 8 | " | stearylacid phosphate (20) | — | — | red ⇌70 black |
| 9 | " | dimyristyl phosphate (20) | — | — | red ⇌45 black |
| 10 | " | dicetyl phosphate (20) | — | — | black red ⇌65 green black |
| 11 | " | distearyl phosphate (20) | — | — | colorless ⇌72 green |
| 12 | " | dibehenyl phosphate (20) | — | — | black ⇌73 green |
| 13 | CF-RR (1.0) | laurylacid phosphate (20) | — | — | red ⇌49 black |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 14 | " | myristylacid phosphate (20) | — | — | red ⇌55 black |
| 15 | " | cetylacid phosphate (20) | — | — | red ⇌59 black |
| 16 | " | stearylacid phosphate (20) | — | — | red ⇌70 black |
| 17 | " | dimyristyl phosphate (20) | — | — | red ⇌44 black |
| 18 | CF-502P (1.0) | cetylacid phosphate (20) | — | — | yellow brown ⇌53 blue |
| 19 | CVL (1.0) | cetylacid phosphate (20) | — | — | light yellow ⇌64 blue |
| 20 | CF-T-126 (1.0) | myristylacid phosphate (10) cetylacid phosphate (10) | — | — | red ⇌60 black |
| 21 | CVL (1.0) | cetylacid phosphate (10) stearylacid phosphate (10) | — | — | yellow ⇌63 blue |
| 22 | CF-T-126 (1.0) | LBT-1830 (20) | — | — | colorless ⇌120 green |
| 23 | CF-RR (1.0) | cetylacid phosphate (25) LBT-1830 (50) | — | — | red ⇌81 black |
| 24 | CF-T-126 (1.0) | cetylacid phosphate (20) LBT-1812 (10) | — | — | vermillion ⇌78 green |
| 25 | CVL (1.0) | cetylacid phosphate (20) LBT-1830 (10) | — | — | yellow ⇌56 blue |
| 26 | " | stearylacid phosphate (40) LBT-1830 (10) | — | — | light yellow ⇌78 blue |
| 27 | " | stearylacid phosphate (40) LBT-1812 (10) | — | — | light yellow ⇌75 blue |
| 28 | CF-RR (1.0) | dilauryl phosphate (20) | — | — | red ⇌36 black |
| 29 | " | distearyl phosphate (20) | — | — | red ⇌70 black |
| 30 | " | dibehenyl phosphate (20) | — | — | red ⇌74 black |
| 31 | " | dilauryl phosphate (10) dimyristyl phosphate (10) | — | — | red ⇌41 black |
| 32 | " | dimyristyl phosphate (8) distearyl phosphate (12) | — | — | red ⇌50 black |
| 33 | CF-502P (1.0) | distearyl phosphate (20) | — | — | light yellow ⇌72 blue |
| 34 | CVL (1.0) | distearyl phosphate (20) | — | — | colorless ⇌70 blue |
| 35 | " | dicetyl phosphate (15) | — | — | colorless ⇌63 blue |
| 36 | " | dibehenyl phosphate (18) | — | — | colorless ⇌72 blue |
| 37 | CF-1014 (1.0) | stearylacid phosphate (4.0) | cetyl alcohol (20) | — | colorless ⇌46 orange |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 38 | CF-G (1.0) | " | " | — | colorless ⇌⁴⁵ green |
| 39 | CF-T-121 (1.0) | " | " | — | colorless ⇌⁴⁵ green black |
| 40 | CF-T-150 (1.0) | " | " | — | colorless ⇌⁴⁵ black |
| 41 | CF-RR (1.0) | " | " | — | colorless ⇌⁴⁵ dark red |
| 42 | CF-T-126 (1.0) | " | " | — | colorless ⇌⁴⁵ green |
| 43 | CF-T-125 (1.0) | " | " | — | light green ⇌⁴⁷ green black |
| 44 | CF-40P (1.0) | " | " | — | colorless ⇌⁴⁶ red pink |
| 45 | CF-HR (1.0) | " | " | — | colorless ⇌⁴⁷ orange |
| 46 | CF-P (1.0) | " | " | — | colorless ⇌⁴⁶ red pink |
| 47 | CF-O (1.0) | " | " | — | colorless ⇌⁴⁶ orange |
| 48 | CF-P-5 (1.0) | " | " | — | colorless ⇌⁴⁶ orange |
| 49 | CF-V (1.0) | " | " | — | colorless ⇌⁴⁶ vermillion |
| 50 | CF-IR (1.0) | " | " | — | colorless ⇌⁴⁵ red pink |
| 51 | Rhodamine B-lactam (1.0) | " | " | — | deep pink ⇌⁴³ colorless |
| 52 | CF-R (1.0) | " | cetyl alcohol (100) | — | colorless ⇌⁴⁵ red pink |
| 53 | CF-T-140 (1.0) | " | " | — | colorless ⇌⁴⁵ brown |
| 54 | CF-P-180 (1.0) | " | " | — | colorless ⇌⁴⁶ black |
| 55 | CF-P-3 (1.0) | " | " | — | colorless ⇌⁴⁷ yellow orange |
| 56 | CF-P-6 (1.0) | " | " | — | brown ⇌⁴⁷ dark green |
| 57 | CF-P-8 (1.0) | " | cetyl alcohol (40) | — | colorless ⇌⁴⁶ blue |
| 58 | CF-P-9 (1.0) | " | cetyl alcohol (20) | — | colorless ⇌⁴⁷ blue purple |
| 59 | CF-P-10 (1.0) | " | " | — | colorless ⇌⁴⁷ purple |
| 60 | CF-P-12 (1.0) | " | " | — | colorless ⇌⁴⁷ red |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 61 | CF-P-13 (1.0) | '' | '' | — | colorless ⇌46⇌ brown |
| 62 | CF-P (0.5) CF-O (0.5) | '' | '' | — | colorless ⇌45⇌ red |
| 63 | CF-G (0.6) CF-P (0.4) | '' | '' | — | colorless ⇌46⇌ black |
| 64 | CF-T-126 (1.0) | stearylacid phosphate (2.0) | cetyl alcohol (50) | — | colorless ⇌47⇌ green |
| 65 | '' | cetylacid phosphate (2.0) | '' | — | colorless ⇌48⇌ green |
| 66 | '' | myristylacid phosphate (2.0) | '' | — | colorless ⇌47⇌ green |
| 67 | '' | laurylacid phosphate (2.0) | '' | — | green ⇌55⇌ colorless |
| 68 | '' | isodecylacid phosphate (2.0) | '' | — | green ⇌49⇌ light green |
| 69 | '' | 2-ethylhexylacid phosphate (2.0) | '' | — | green ⇌49⇌ colorless |
| 70 | '' | n-butylacid phosphate (2.0) | '' | — | green ⇌50⇌ colorless |
| 71 | '' | diphenyl phosphate (2.0) | '' | — | red ⇌40⇌ green |
| 72 | CF-RR (1.0) | diphenyl phosphate (2.0) | '' | — | red ⇌43⇌ black |
| 73 | CF-IR (1.0) | myristylacid phosphate (4.0) | '' | — | colorless ⇌34⇌ red pink |
| 74 | '' | myristylacid phosphate (2.0) cetylacid phosphate (2.0) | '' | — | colorless ⇌32⇌ red pink |
| 75 | '' | dicyclohexyl phosphate (4.0) | myristyl alcohol (50) | — | colorless ⇌29⇌ red pink |
| 76 | CF-T-126 (1.0) | LBT-1830 (2.0) | stearic acid (20) | — | colorless ⇌61⇌ green |
| 77 | CF-40P (1.0) | '' | myristic acid (20) | — | colorless ⇌48⇌ red pink |
| 78 | CF-T-126 (1.0) | LBT-1820 (2.0) | lauric acid (20) | — | colorless ⇌34⇌ light green |
| 79 | '' | LBT-1812 (2.0) | stearic acid (20) | — | colorless ⇌59⇌ light green |
| 80 | CVL (1.0) | LBT-1830 (2.0) | '' | — | colorless ⇌62⇌ light blue |
| 81 | CF-P-5 (1.0) | '' | '' | — | colorless ⇌60⇌ orange |
| 82 | CF-P (1.0) | LBT-1820 (2.0) | '' | — | light pink ⇌45⇌ colorless |
| 83 | CF-RR (1.0) | 2,3-xylyl acid phosphate (2.0) | cetyl alcohol (50) | — | colorless ⇌45⇌ dark red |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 84 | CF-V (1.0) | diphenyl phosphate (3.0) | stearyl alcohol (50) | — | red brown $\xrightleftharpoons{58}$ green |
| 85 | CF-T-126 (1.0) | MC-410 (2.0) | cetyl alcohol (50) | — | light green $\xrightleftharpoons{48}$ colorless |
| 86 | " | RE-610 (2.0) | " | — | light green $\xrightleftharpoons{50}$ colorless |
| 87 | " | cyclohexylacid phosphate (2.0) | " | — | light green $\xrightleftharpoons{50}$ colorless |
| 88 | CF-RR (1.0) | dibehenyl phosphate (4.0) | cetyl alcohol (20) | — | colorless $\xrightleftharpoons{50}$ dark red |
| 89 | " | distearyl phosphate (4.0) | " | — | colorless $\xrightleftharpoons{48}$ dark red |
| 90 | " | dicetyl phosphate (4.0) | " | — | colorless $\xrightleftharpoons{47}$ dark red |
| 91 | " | dimyristyl phosphate (4.0) | " | — | colorless $\xrightleftharpoons{46}$ dark red |
| 92 | CF-G (1.0) | cobalt salt of dimyristyl phosphate (8.0) | stearyl alcohol (20) | — | colorless $\xrightleftharpoons{63}$ light green |
| 93 | CF-1014 (1.0) | naphthylacid phosphate (4.0) | myristyl alcohol (20) | — | colorless $\xrightleftharpoons{30}$ yellow orange |
| 94 | CF-121 (1.0) | p-cumenylacid phosphate (3.0) | lauryl alcohol (20) | — | colorless $\xrightleftharpoons{12}$ green black |
| 95 | CF-IR (1.0) | benzylacid phosphate (4.0) | behenyl alcohol (20) | — | colorless $\xrightleftharpoons{72}$ red pink |
| 96 | CF-T-140 (1.0) | o-tolylacid phosphate (2.0) | cetyl alcohol (20) | — | colorless $\xrightleftharpoons{49}$ brown |
| 97 | CF-T-126 (1.0) | stearylacid phosphate (2.0) | lauryl alcohol (50) | — | colorless $\xrightleftharpoons{15}$ green |
| 98 | CF-1014 (1.0) | " | lauryl alcohol (40) myristyl alcohol (10) | — | colorless $\xrightleftharpoons{10}$ orange |
| 99 | CF-G (1.0) | " | lauryl alcohol (30) myristyl alcohol (20) | — | colorless $\xrightleftharpoons{14}$ green |
| 100 | CF-T-121 (1.0) | " | lauryl alcohol (20) myristyl alcohol (30) | — | colorless $\xrightleftharpoons{21}$ green black |
| 101 | CF-T-150 (1.0) | " | lauryl alcohol (10) myristyl alcohol (40) | — | colorless $\xrightleftharpoons{25}$ black |
| 102 | CF-RR (1.0) | " | myristyl alcohol (50) | — | colorless $\xrightleftharpoons{29}$ dark red |
| 103 | CF-T-125 (1.0) | " | myristyl alcohol (40) cetyl alcohol (10) | — | light green $\xrightleftharpoons{34}$ green black |
| 104 | CF-40P (1.0) | " | myristyl alcohol (30) cetyl alcohol (20) | — | colorless $\xrightleftharpoons{37}$ red pink |
| 105 | CF-HR (1.0) | " | myristyl alcohol (20) cetyl alcohol (30) | — | colorless $\xrightleftharpoons{40}$ orange |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 106 | CF-P-5 (1.0) | " | myristyl alcohol (10) cetyl alcohol (40) | — | colorless ⇌ orange (42) |
| 107 | CF-O (1.0) | " | cetyl alcohol (50) | — | colorless ⇌ orange (47) |
| 108 | CF-P (1.0) | " | cetyl alcohol (40) stearyl alcohol (10) | — | colorless ⇌ red pink (47) |
| 109 | CF-V (1.0) | " | cetyl alcohol (30) stearyl alcohol (20) | — | colorless ⇌ vermillion (51) |
| 110 | CF-IR (1.0) | " | cetyl alcohol (40) stearyl alcohol (10) | — | colorless ⇌ red pink (53) |
| 111 | CF-1014 (1.0) | " | stearyl alcohol (50) | — | colorless ⇌ yellow orange (60) |
| 112 | CF-T-126 (1.0) | " | stearyl alcohol (40) behenyl alcohol (10) | — | colorless ⇌ green (56) |
| 113 | CF-RR (1.0) | " | stearyl alcohol (30) behenyl alcohol (20) | — | colorless ⇌ dark red (57) |
| 114 | CF-P (1.0) | " | stearyl alcohol (20) behenyl alcohol (30) | — | colorless ⇌ red pink (60) |
| 115 | CF-RR (1.0) | " | stearyl alcohol (10) behenyl alcohol (40) | — | colorless ⇌ dark red (62) |
| 116 | CF-G (1.0) | " | behenyl alcohol (50) | — | colorless ⇌ green (70) |
| 117 | CF-T-126 (1.0) | cetylacid phosphate (2.0) | diamond wax (50) | — | green ⇌ colorless (77) |
| 118 | CF-RR (1.0) | " | " | — | dark red ⇌ colorless (79) |
| 119 | CF-P-5 (1.0) | " | stearylamide (50) | — | orange ⇌ colorless (96) |
| 120 | CF-IR (1.0) | stearylacid phosphate (2.0) | " | — | red pink ⇌ colorless (98) |
| 121 | CF-T-150 (1.0) | " | erucic acid amine (50) | — | green ⇌ colorless (79) |
| 122 | CF-G (1.0) | " | " | — | green ⇌ colorless (81) |
| 123 | CF-P (1.0) | " | 1,10-decandiol (50) | — | red pink ⇌ colorless (73) |
| 124 | CF-T-126 (1.0) | stearylacid phosphate (4.0) | cetyl alcohol (30) stearyl laurate (10) | — | colorless ⇌ green (42) |
| 125 | CF-1014 (1.0) | cetylacid phosphate (4.0) | stearyl alcohol (30) stearyl stearate (10) | — | colorless ⇌ yellow orange (45) |
| 126 | CF-T-126 (1.0) | diphenyl phosphate (4.0) | cetyl alcohol (50) | — | red brown ⇌ green (44) |
| 127 | " | " | stearyl alcohol (50) | — | red brown ⇌ green (58) |
| 128 | " | " | behenyl alcohol (50) | — | red brown ⇌ green (65) |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 129 | " | cetylacid phosphate (10) | stearyl stearate (50) | — | red ⇌ 62 black |
| 130 | " | " | stearyl laurate (50) | — | red ⇌ 50 black |
| 131 | " | " | stearyl caprate (50) | — | red ⇌ 41 black |
| 132 | " | " | cetyl caprate (50) | — | red ⇌ 32 black |
| 133 | " | " | butyl palmitate (50) | — | red ⇌ 19 black |
| 134 | " | " | decyl caprate (50) | — | red ⇌ 11 black |
| 135 | " | " | octyl caprate (50) | — | red ⇌ −5 black |
| 136 | CF-RR (1.0) | cetylacid phosphate (2.0) | cetyl alcohol (40) stearic acid amide (10) | — | colorless ⇌ 48 dark red |
| 137 | " | " | cetyl alcohol (40) lauric acid (10) | — | colorless ⇌ 29 dark red |
| 138 | " | " | stearyl alcohol (40) tetradecyl ether (10) | — | colorless ⇌ 56 dark red |
| 139 | CF-T-126 (1.0) | stearylacid phosphate (11) | distearyl ether (50) | — | red brown ⇌ 59 black |
| 140 | " | " | dimyristyl ether (50) | — | red brown ⇌ 42 black |
| 141 | " | " | dilauryl ether (50) | — | red brown ⇌ 32 black |
| 142 | CF-G (1.0) | " | stearone (50) | — | red brown ⇌ 78 black |
| 143 | CF-T-121 (1.0) | " | tristearyl phosphate (50) | — | black ⇌ 48 colorless |
| 144 | CF-T-150 (1.0) | " | trilauryl phosphate (50) | — | black ⇌ 32 colorless |
| 145 | CF-40P (1.0) | dibehenyl phosphate (4.0) | lauryl alcohol (20) | — | colorless ⇌ 21 red pink |
| 146 | " | " | myristyl alcohol (20) | — | colorless ⇌ 38 red pink |
| 147 | " | " | cetyl alcohol (20) | — | colorless ⇌ 45 red pink |
| 148 | " | " | stearyl alcohol (20) | — | colorless ⇌ 54 red pink |
| 149 | " | " | behenyl alcohol (20) | — | colorless ⇌ 62 red pink |
| 150 | " | " | cetyl alcohol (10) stearyl alcohol (10) | — | colorless ⇌ 49 red pink |
| 151 | CF-RR (1.0) | distearyl phosphate (4.0) | n-decyl alcohol (20) | — | colorless ⇌ 44 dark red |
| 152 | " | " | n-decyl alcohol (10) lauryl alcohol (10) | — | colorless ⇌ 46 dark red |

TABLE 1-continued

| Ex. No. | Thermochromic Material | | | Additive (g) | Thermochromic Properties Temperature of Coloration/Decoloration (°C.) |
|---|---|---|---|---|---|
| | Component (A) (g) | Component (B) (g) | Component (C) (g) | | |
| 153 | " | " | lauryl alcohol (20) | — | colorless $\underset{}{\overset{53}{\rightleftarrows}}$ dark red |
| 154 | " | " | lauryl alcohol (10) myristyl alcohol (10) | — | colorless $\underset{}{\overset{42}{\rightleftarrows}}$ dark red |
| 155 | " | " | myristyl alcohol (20) | — | colorless $\underset{}{\overset{45}{\rightleftarrows}}$ dark red |
| 156 | " | " | myristyl alcohol (10) cetyl alcohol (10) | — | colorless $\underset{}{\overset{49}{\rightleftarrows}}$ dark red |
| 157 | " | " | cetyl alcohol (20) | — | colorless $\underset{}{\overset{48}{\rightleftarrows}}$ dark red |
| 158 | " | " | cetyl alcohol (10) stearyl alcohol (10) | — | colorless $\underset{}{\overset{49}{\rightleftarrows}}$ dark red |
| 159 | " | " | stearyl alcohol (20) | — | colorless $\underset{}{\overset{56}{\rightleftarrows}}$ dark red |
| 160 | " | " | stearyl alcohol (10) behenyl alcohol (10) | — | colorless $\underset{}{\overset{55}{\rightleftarrows}}$ dark red |
| 161 | " | " | behenyl alcohol (20) | — | colorless $\underset{}{\overset{62}{\rightleftarrows}}$ dark red |
| 162 | CF-P-5 (1.0) | dicetyl phosphate (4.0) | lauryl alcohol (20) | — | colorless $\underset{}{\overset{18}{\rightleftarrows}}$ orange |
| 163 | " | " | lauryl alcohol (10) myristyl alcohol (10) | — | colorless $\underset{}{\overset{25}{\rightleftarrows}}$ orange |
| 164 | " | " | myristyl alcohol (20) | — | colorless $\underset{}{\overset{27}{\rightleftarrows}}$ orange |
| 165 | " | " | myristyl alcohol (10) cetyl alcohol (10) | — | colorless $\underset{}{\overset{38}{\rightleftarrows}}$ orange |
| 166 | " | " | cetyl alcohol (20) | — | colorless $\underset{}{\overset{46}{\rightleftarrows}}$ orange |
| 167 | " | " | cetyl alcohol (10) stearyl alcohol (10) | — | colorless $\underset{}{\overset{47}{\rightleftarrows}}$ orange |
| 168 | " | " | stearyl alcohol (20) | — | colorless $\underset{}{\overset{48}{\rightleftarrows}}$ orange |
| 169 | " | " | stearyl alcohol (10) behenyl alcohol (10) | — | colorless $\underset{}{\overset{50}{\rightleftarrows}}$ orange |
| 170 | " | " | behenyl alcohol (20) | — | colorless $\underset{}{\overset{48}{\rightleftarrows}}$ orange |
| 171 | CF-40P (1.0) | dimyristyl phosphate (4.0) | n-dodecyl alcohol (20) | — | colorless $\underset{}{\overset{-9}{\rightleftarrows}}$ red pink |
| 172 | " | " | n-decyl alcohol (10) lauryl alcohol (10) | — | colorless $\underset{}{\overset{-3}{\rightleftarrows}}$ red pink |
| 173 | " | " | lauryl alcohol (20) | — | colorless $\underset{}{\overset{5}{\rightleftarrows}}$ red pink |
| 174 | " | " | lauryl alcohol (10) myristyl alcohol (10) | — | colorless $\underset{}{\overset{24}{\rightleftarrows}}$ red pink |
| 175 | " | " | myristyl alcohol (10) | — | colorless $\underset{}{\overset{31}{\rightleftarrows}}$ red pink |
| 176 | " | " | myristyl alcohol (10) cetyl alcohol (10) | — | colorless $\underset{}{\overset{35}{\rightleftarrows}}$ red pink |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 177 | " | " | cetyl alcohol (20) | — | colorless $\xrightleftharpoons{36}$ red pink |
| 178 | " | " | cetyl alcohol (10) stearyl alcohol (10) | — | colorless $\xrightleftharpoons{39}$ red pink |
| 179 | CF-T-126 (1.0) | " | lauryl alcohol (14) butyl stearate (6) | — | colorless $\xrightleftharpoons{-8}$ green |
| 180 | " | " | lauryl alcohol (7) myristyl alcohol (7) butyl stearate (6) | — | colorless $\xrightleftharpoons{-5}$ green |
| 181 | " | " | lauryl alcohol (14) octyl laurate (6) | — | colorless $\xrightleftharpoons{-14}$ green |
| 182 | " | " | lauryl alcohol (7) myristyl alcohol (7) octyl laurate (6) | — | colorless $\xrightleftharpoons{5}$ green |
| 183 | " | " | lauryl alcohol (7) myristyl alcohol (7) heptyl caprate (6) | — | colorless $\xrightleftharpoons{-6}$ green |
| 184 | " | " | n-decyl alcohol (14) octyl laurate (6) | — | colorless $\xrightleftharpoons{-2}$ green |
| 185 | " | " | n-decyl alcohol (12) heptyl caprate (8) | — | colorless $\xrightleftharpoons{-5}$ green |
| 186 | " | " | n-decyl alcohol (14) lauryl alcohol (6) | — | colorless $\xrightleftharpoons{-3}$ green |
| 187 | CF-RR (1.0) | laurylacid phosphate (20) | — | UV 327 (0.5) | red $\xrightleftharpoons{49}$ black |
| 188 | " | stearylacid phosphate (20) | — | UV 110 (0.5) | red $\xrightleftharpoons{70}$ black |
| 189 | CVL (1.0) | cetylacid phosphate (20) | — | UV 612NH (0.3) | light yellow $\xrightleftharpoons{64}$ blue |
| 190 | CF-T-126 (1.0) | dicetyl phosphate (20) | — | UV 328 (0.6) | black $\xrightleftharpoons{65}$ green |
| 191 | CF-40P (1.0) | dimyristyl phosphate (4.0) | n-decyl alcohol (20) | UV N35 (1.0) | colorless $\xrightleftharpoons{-11}$ red pink |
| 192 | CF-1014 (1.0) | stearylacid phosphate (4.0) | cetyl alcohol (20) | TBS (0.6) | colorless $\xrightleftharpoons{46}$ orange |
| 193 | CF-T-121 (1.0) | stearylacid phosphate (4.0) | n-octyl alcohol (20) | WX (0.3) | colorless $\xrightleftharpoons{-18}$ black |
| 194 | CF-P (1.0) | cetylacid phosphate (4.0) | cetyl alcohol (20) | AO (1.0) | colorless $\xrightleftharpoons{46}$ red pink |
| 195 | CF-T-126 (1.0) | diphenyl phosphate (2.0) | cetyl alcohol (50) | UV 103 (0.8) | red brown $\xrightleftharpoons{44}$ green |
| 196 | CF-P-5 (1.0) | dicetyl phosphate (4.0) | lauryl alcohol (20) | UV PS (1.0) | colorless $\xrightleftharpoons{18}$ orange |
| 197 | CF-RR (1.0) | diphenyl phosphate (4.0) | behenyl alcohol (50) | MS (1.0) | colorless $\xrightleftharpoons{60}$ dark red |
| 198 | CF-IR (1.0) | benzylacid phosphate (4.0) | behenyl alcohol (20) | 160° F. microcrystalline wax (3) | colorless $\xrightleftharpoons{75}$ red pink |

TABLE 1-continued

| Ex. No. | Thermochromic Material Component (A) (g) | Component (B) (g) | Component (C) (g) | Additive (g) | Thermochromic Properties Temperature of Coloration/Decoloration (°C.) |
|---|---|---|---|---|---|
| 199 | CF-T-126 (1.0) | MC-410 (2.0) | cetyl alcohol (50) | fluid paraffin (8) | green $\xrightleftharpoons{41}$ colorless |
| 200 | CF-40P (1.0) | dimyristyl phosphate (4.0) | n-octyl alcohol (20) | BOS (0.01) | blue $\xrightleftharpoons{-21}$ purple |
| 201 | " | " | n-hexyl alcohol (25) | ASY-GRH (0.01) | yellow $\xrightleftharpoons{-49}$ red |
| 202 | CF-T-126 (1.0) | cetylacid phosphate (2.0) | stearylamide (50) | Yellow GG (0.01) | green $\xrightleftharpoons{96}$ yellow |
| 203 | CF-P (1.0) | stearylacid phosphate (2.0) | 1,10-decanediol (50) | Blue B2G (0.01) | purple $\xrightleftharpoons{73}$ blue |
| 204 | CVL (1.0) | cetylacid phosphate (2.0) | — | VFY 3107 (0.02) | yellow $\xrightleftharpoons{64}$ green |

Examples 205 to 210 illustrate microencapsulated thermochromic materials. Unless otherwise indicated, all parts, percents, ratios, etc., are by weight.

EXAMPLE 205

15 g of a urea-formaldehyde precondensate (solid content: 38%; specific gravity: 1.16) was dissolved in 135 g of water, and 30 g of the thermochromic material prepared in Example 8 and maintained at 80° C. was added dropwise to the solution and stirred so as to produce fine droplets. Citric acid was added to lower the pH to 4. On stirring for 5 hours while maintaining the temperature at 45° to 50° C., a polymeric material insoluble in either of water and the thermochromic material was formed. The thermochromic material was covered with the water-insoluble polymeric materials, resulting in the formation of capsules containing the thermochromic material.

EXAMPLE 206

1.0 g of aliphatic polyisocyanate (solid content: 75%; NCO content: 15%) was dissolved in 30 g of the thermochromic material prepared in Example 49 by heating, and the resulting solution was added dropwise to 150 g of a 3% aqueous solution of polyvinyl alcohol (degree of polymerization: 1,000 to 1,500; degree of saponification: 86 to 89 mol %) and stirred so as to produce fine droplets. A solution of 2 g of an amine adduct of epoxy resin in 20 g of water was gradually added to the solution which was still being stirred. On stirring the resulting solution for about 5 hours while maintaining the temperature at 50° C., the aliphatic polyisocyanate reacted with the amine adduct of epoxy resin at the interface between the droplet of the thermochromic material and water, forming a solid polyurea insoluble in either of water and the thermochromic material. The thus formed solid polyurea covered the thermochromic material, yielding capsules containing the thermochromic material.

EXAMPLE 207

5 g of an epoxy resin (Bisphenol A diglycidyl polyether, M.W.: 378) was dissolved in 80 g of the thermochromic material prepared in Example 6 at 80° C. The resulting solution was dissolved in 150 g of a 5% aqueous gelatin solution and stirred so as to form fine droplets. A solution of an amine adduct of epoxy resin in 20 g of water was gradually added to the solution which was still being stirred. On stirring for about 4 hours while maintaining the temperature at 80° C., the epoxy resin reacted with the amine adduct of epoxy resin at the interface between the fine droplet of the thermochromic material and water, forming a solid polymeric material insoluble in the water and thermochromic material. The solid polymeric material covered the thermochromic material, yielding capsules containing the thermochromic material.

EXAMPLE 208

5.0 g of a polyfunctional acrylate oligomer and 0.2 g of diisopropylbenzene hydroperoxide were dissolved by heating in 30 g of the thermochromic material prepared in Example 171 and added dropwise to 100 g of an 8% aqueous solution of polyvinyl alcohol (degree of polymerization: 1,000 to 1,500; degree of saponification: 99.0 to 100 mol %). The resulting mixture was stirred so as to form fine droplets. While maintaining the temperature at about 60° C., a 5% aqueous solution of sodium hydrogensulfite (NaHSO₃) was gradually added dropwise thereto. On stirring for about 3 hours while maintaining the liquid temperature at 60° C., the polyfunctional acrylate oligomer yielded an acryl resin insoluble in either of the thermochromic material and water at the interface therebetween. The acryl resin thus formed covered the thermochromic material, yielding capsules containing the thermochromic material.

EXAMPLE 209

4 g of bisphenol A was dissolved in 200 g of a 0.8% aqueous solution of sodium hydroxide. To the solution thus prepared was added 80 g of the thermochromic material prepared in Example 172 in which 8 g of terephthalic acid dichloride had been dissolved by heating. The resulting mixture was stirred until fine droplets were formed. Subsequently, on stirring for about 1 hour while maintaining the liquid temperature at 50° C., the terephthalic acid dichloride reacted with the bisphenol A at the interface between the fine droplet of the thermochromic material and water, yielding a solid saturated polyester insoluble in either of the thermochromic material and water. The solid saturated polyester covered the thermochromic material, providing capsules containing the thermochromic material.

EXAMPLE 210

A dispersion medium prepared by mixing 10 g of a 16% aqueous solution of acid-treated gelatin, 0.7 g of a 10% aqueous solution of acetic acid, and 0.2 g of sulfated castor oil was heated up to 50° C., and 30 g of the thermochromic material prepared in Example 181 was added dropwise. The resulting mixture was stirred until fine droplets were formed. While maintaining the liquid temperature at about 50° C., a 1% aqueous solution of carboxymethyl cellulose (average degree of polymerization: 120 to 150) was gradually added dropwise with stirring. When the dropwise addition was completed, the pH reached about 4.5, and the thus formed coacervate film covered fine droplets of the thermochromic material. Then, in order to allow the coacervate film to gel, the film was cooled down to 9° C., 1 g of a 25% aqueous solution of glutaraldehyde was added, and furthermore, the pH was adjusted to 5.4 by adding a 10% aqueous solution of sodium hydroxide and the resulting mixture was stirred for about 1 hour. Thereafter, the liquid temperature was raised to 40° C., and on stirring for about 8 hours, a gelatin cured product insoluble in either of the thermochromic material and water covered the thermochromic material, yielding capsules containing the thermochromic material.

The temperatures of coloration/decoloration of the microencapsulated thermochromic materials are shown in Table 2.

TABLE 2

| Example No. | Temperature of Coloration/Decoloration (°C.) | Color at Temperature below the Temperature of Coloration/Decoloration | Color at Temperature above the Temperature of Coloration/Decoloration |
|---|---|---|---|
| 205 | 70 | red | black |
| 206 | 46 | colorless | vermillion |
| 207 | 58 | red | black |
| 208 | −9 | colorless | red pink |
| 209 | −3 | colorless | red pink |
| 210 | −11 | colorless | green |

As described above, the thermochromic material of the invention has excellent characteristics. Accordingly, it can be utilized in new fields of applications as well as in those in which thermochromic materials as described in U.S. Pat. No. 4,028,118 are used.

Fields of applications for which the thermochromic material of the invention can be used include: (1) detection of temperature, particularly in low temperature industry, (2) inspection of chemical reactions utilizing the color changes caused by an increase or decrease in temperature, (3) prevention of accidents by indicating the temperature in a container of dangerous material or in a storeroom, (4) measurement of temperature distribution in chemical apparatuses, (5) temperature-indicator for easy detection of heat generated by overloaded electric circuits and appliances, (6) indication of safe and suitable temperatures for home appliances, such as a refrigerator, a cooler, a heating device, and a bath, and (7) display panels, teaching materials, toys, etc., in which there are utilized various alternations in color, amusement, magic effects, and applications where the background is to be shielded or revealed.

While the invention has been described in detail and with reference to specific embodiments thereof, it will be apparent to one skilled in the art that various changes and modifications can be made therein without departing from the spirit and scope thereof.

What is claimed is:

1. A reversible thermochromic material comprising:
   (A) one or more electron-donating chromatic organic compounds selected from the group consisting of diaryl phthalides, indolyl phthalides, polyaryl carbinols, leuco auramines, acyl auramines, aryl auramines, Rhodamine B lactam, indolines, spiropyrans and fluorans, and
   (B) one or more acidic phosphoric acid ester compounds of the following general formula (I):

wherein $R_1$ and $R_2$, which may be the same or different, each represents hydrogen, an alkyl group having from 1 to 22 carbon atoms, a branched alkyl group having from 3 to 20 carbon atoms, an alkenyl group having from 3 to 20 carbon atoms, a cycloalkyl group having from 5 to 24 carbon atoms or an aryl group having from 6 to 20 carbon atoms in proviso that $R_1$ and $R_2$ do not represent hydrogen at the same time, and M represents hydrogen, sodium, potassium, lithium, calcium, zinc, zirconium, aluminum, magnesium, nickel, cobalt, tin, copper, iron, vanadium, titanium, lead or molybdenum, the ratio of Component (A) to Component (B) being 1:1/10 to 50 by weight, said thermochromic material undergoing reversible metachromatism at a temperature within the range of from 40° C. to 120° C.

2. A thermochromic material as claimed in claim 1, which is enclosed in microcapsules having a size not exceeding 30 μm.

3. A reversible thermochromic material comprising:
   (A) one or more electron-donating chromatic organic compounds selected from the group consisting of diaryl phthalides, indolyl phthalides, polyaryl carbinols, leuco auramines, acyl auramines, aryl auramines, Rhodamine B lactam, indolines, spiropyrans and fluorans,
   (B) one or more acidic phosphoric acid ester compounds of the following general formula (I):

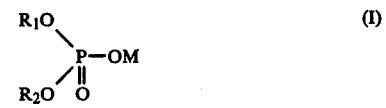

wherein $R_1$ and $R_2$, which may be the same or different, each represents hydrogen, an alkyl group having from 1 to 22 carbon atoms, a branched alkyl group having from 3 to 20 carbon atoms, an alkenyl group having from 3 to 20 carbon atoms, a cycloalkyl group having from 5 to 24 carbon atoms, or an aryl group having from 6 to 20 carbon atoms in proviso that $R_1$ and $R_2$ do not represent hydrogen at the same time, and M represents hydrogen, sodium, potassium, lithium, calcium, zinc, zirconium, aluminum, magnesium, nickel, cobalt, tin, copper, iron, vanadium, titanium, lead or molybdenum, and (C) one or more compounds selected from the group consisting of aliphatic monohydric alcohols having from 4 to 31 carbon atoms, alicyclic monohydric alcohols having from 5 to 10 carbon atoms, aromatic monohydric alcohols having from 7 to 9 carbon atoms, polyhydric alcohols having from 2 to 6 carbon atoms, polyethylene glycols having a molecular weight from 200 to 20,000, sugar alcohols, ester compounds of monocarboxylic acid having from 2 to 22 carbon atoms and aliphatic monohydric alcohols having from 1 to 22 carbon atoms, ester compounds of monocarboxylic acid having from 2 to 22 carbon atoms and phenols having from 6 to 18 carbon atoms, ester compounds of monocarboxylic acid having from 2 to 22 carbon atoms and polyhydric alcohols having from 2 to 6 carbon atoms, ester compounds of polycarboxylic acids having from 2 to 12 carbon atoms and aliphatic monohydric alcohols having from 1 to 22 carbon atoms, aromatic sulfonic acid esters having from 8 to 24 carbon atoms, aliphatic sulfonic acid esters having from 8 to 20 carbon atoms, phosphoric acid triesters of aliphatic monohydric alcohols having from 2 to 18 carbon atoms or phenols having from 6 to 15 carbon atoms, aliphatic ketones having from 5 to 35 carbon atoms, aromatic ketones having from 8 to 13 carbon atoms, fatty acid amides having from 2 to 22 carbon atoms and their N-alkyl-substituted compounds, aliphatic ethers having from 8 to 36 carbon atoms, aromatic ethers having from 12 to 20 carbon atoms, aliphatic monocarboxylic acids having from 6 to 22 carbon atoms, aliphatic polycarboxylic acids having from 3 to 12 carbon atoms, aromatic monocarboxylic acids having from 7 to 11 carbon atoms and aromatic polycarboxylic acids having from 8 to 14 carbon atoms, the ratio of Component (A): Component (B): Component (C) being 1:1/10 to 50:1 to 800 by weight, said thermochromic material undergoing reversible metachromatism at a temperature within the range from $-50°$ C. to $100°$ C., in such a manner that said thermochromic material exhibits a high temperature side coloring type metachromatism.

4. A thermochromic material as claimed in claim 3, which is enclosed in microcapsules having a size not exceeding 30 $\mu$m.

* * * * *